US009657234B1

(12) United States Patent
Koch

(10) Patent No.: US 9,657,234 B1
(45) Date of Patent: May 23, 2017

(54) MOBILE TRANSPORT FUEL REFINERY SYSTEM AND METHOD, FUEL REFINERY AND DISPENSING SYSTEM AND METHOD, AND FUEL COMPOSITION

(71) Applicant: EcoChem Alternative Fuels LLC, Dublin, OH (US)

(72) Inventor: Joshua F. Koch, Columbus, OH (US)

(73) Assignee: EcoChem Alternative Fuels LLP, Dublin, OH (US)

( * ) Notice: Subject to any disclaimer, the term of this patent is extended or adjusted under 35 U.S.C. 154(b) by 44 days.

(21) Appl. No.: 14/611,199

(22) Filed: Jan. 31, 2015

Related U.S. Application Data

(60) Provisional application No. 61/934,395, filed on Jan. 31, 2014.

(51) Int. Cl.

| | |
|---|---|
| ***C10L 1/00*** | (2006.01) |
| ***C10G 15/00*** | (2006.01) |
| ***C10L 1/185*** | (2006.01) |
| ***C10L 1/16*** | (2006.01) |
| ***C10L 10/12*** | (2006.01) |
| ***B01J 19/08*** | (2006.01) |

(Continued)

(52) U.S. Cl.
CPC ............ *C10G 15/00* (2013.01); *B01J 19/087* (2013.01); *B67D 7/04* (2013.01); *B67D 7/766* (2013.01); *C10L 1/16* (2013.01); *C10L 1/1857* (2013.01); *C10L 10/12* (2013.01); *B01J 2219/085* (2013.01); *C10L 2200/0446* (2013.01); *C10L 2230/04* (2013.01); *C10L 2270/026* (2013.01); *C10L 2290/547* (2013.01)

(58) Field of Classification Search
CPC ... C10G 15/00; C10G 2300/4062; C10L 1/16; C10L 10/12; C10L 1/1857; C10L 2200/0446; C10L 2230/04; C10L 2270/026; C10L 2290/547; B01J 19/087; B01J 2219/085; B67D 7/04; B67D 7/766
See application file for complete search history.

(56) References Cited

U.S. PATENT DOCUMENTS 3,953,298 A * 4/1976 Hogan ..................... C10G 7/00 196/133
4,983,259 A * 1/1991 Duncan .................... B01D 3/14 196/106
5,174,892 A 12/1992 Davis (Continued)

*Primary Examiner* — Cephia D Toomer
(74) *Attorney, Agent, or Firm* — Benesh Friedlander Coplan & Aronoff LLP; Benjamen E. Kern; Thomas Y. Kendrick

(57) ABSTRACT

A mobile diesel fuel refinery system comprise a particulate filter adapted to remove particulates from diesel fuel flowing through the diesel fuel conduction system, a water filter adapted to remove water from diesel fuel flowing through the diesel fuel conduction system following its passage through the particulate filter, a magnetic field of sufficient strength to further refine the diesel fuel flowing through the diesel fuel conduction system following its passage through the water filter, a catalyst injector configured to inject the catalyst from a catalyst tank into the diesel fuel flowing through the diesel fuel conduction system following its passage through the magnetic field, a dispensing conduit configured to conduct the diesel fuel from the diesel fuel refinement apparatus following injection of the catalyst.

12 Claims, 13 Drawing Sheets

(51) Int. Cl.

| | |
|---|---|
| ***B67D 7/04*** | (2010.01) |
| ***B67D 7/76*** | (2010.01) |

(56) References Cited

U.S. PATENT DOCUMENTS

| | | | | |
|---|---|---|---|---|
| 5,316,743 | A * | 5/1994 | LeBlanc .......... C10M 175/0025 196/106 | |
| 5,958,237 | A | 9/1999 | Cort et al. | |
| 6,596,174 | B1 | 7/2003 | Marcus | |
| 6,974,537 | B2 | 12/2005 | Abdelqader | |
| 7,704,383 | B2 | 4/2010 | Zulauf et al. | |
| 8,070,940 | B2 | 12/2011 | Yonemoto et al. | |
| 8,329,033 | B2 | 12/2012 | Klein et al. | |
| 8,365,924 | B2 | 2/2013 | Sokolchik et al. | |
| 2005/0006290 | A1* | 1/2005 | Patten ................ B01D 17/0202 210/198.1 | |
| 2006/0037919 | A1 | 2/2006 | Lara et al. | |
| 2011/0167712 | A1* | 7/2011 | Brasil ..................... C07C 67/03 44/307 | |

* cited by examiner

MOBILE TRANSPORT FUEL REFINERY SYSTEM AND METHOD, FUEL REFINERY AND DISPENSING SYSTEM AND METHOD, AND FUEL COMPOSITION

RELATED APPLICATION DATA

This application claims the priority benefit of U.S. Provisional Application Ser. No. 61/934,395, filed Jan. 31, 2014, which is hereby incorporated in its entirety herein by reference.

FIELD OF THE INVENTION

This invention is directed generally to mobile fuel refinery systems and methods, fuel dispensing systems and methods, and fuel compositions.

BACKGROUND

The transportation industry continues to struggle against increasing vehicle fueling and maintenance costs, increasing vehicle performance demands, and expanding emissions regulations from regulatory agencies. Modern vehicles are forced to operate using fuels having inconsistent quality and a significant amount of contaminants. Ultra-low sulfur diesel is one such fuel of poor or inconsistent quality. Once fuel is refined, it is stored in corroding storage tanks and pipelines and transported in corroding tanks having particulates and other contaminants certain to degrade the fuel quality. Storage in these tanks also causes bacterial growth, which accelerates fuel degradation. Due to flushing of the lines and tanks, water also becomes trapped in the fuel. The time and distance from refinery to vehicle fuel tank can be significant and thus further increases the likelihood of contamination from water and other impurities. As a result, vehicle fuel quality can vary as much as 30%.

This inconsistent fuel quality does not go without consequence. Inconsistent fuel quality adds to the maintenance costs of a vehicle. Diesel engine experts report that poor quality fuel is the most likely cause of engine failure. Additionally, poor fuel quality results in reduced performance and lower combustion efficiency. In the case of corporate and municipal fleets, the impact of reduced performance and, therefore, increased fuel costs of each vehicle across an entire fleet is significant. Engine failure and maintenance costs added to the fuel costs further aggravate the expensive issues caused by fuel quality for a fleet. Moreover, a lower quality fuel will release more VOCs such as NOX, HC, and black smoke into the atmosphere, thereby significantly impacting our environment. Fuel costs, vehicle maintenance costs, engine performance, and exhaust emissions represent major consequences to the reduced and inconsistent quality of vehicle fuel.

BRIEF SUMMARY

In accordance with an aspect of the invention, a mobile diesel fuel refinery system is provided comprising a trailer having an underside and comprising wheels, a containment tank mounted on the trailer and adapted to contain and supply diesel fuel, a diesel fuel refinement apparatus mounted on the underside of the trailer and configured to accept diesel fuel from the containment tank. The apparatus comprises a diesel fuel conduction system, a catalyst tank containing a catalyst, and, in series, a particulate filter adapted to remove particulates from diesel fuel flowing through the diesel fuel conduction system, a water filter adapted to remove water from diesel fuel flowing through the diesel fuel conduction system following its passage through the particulate filter, a magnetic field of sufficient strength to further refine the diesel fuel flowing through the diesel fuel conduction system following its passage through the water filter, a catalyst injector configured to inject the catalyst from the catalyst tank into the diesel fuel flowing through the diesel fuel conduction system following its passage through the magnetic field, and a dispensing conduit configured to conduct the diesel fuel from the diesel fuel refinement apparatus following injection of the catalyst.

The particulate filter may be of sufficient fineness to reduce microbial contamination in the diesel fuel. The particulate filter may additionally comprise a pressure gauge. The water filter may be of sufficient fineness to reduce particles of about 10 microns in the diesel fuel. The water filter may additionally comprise a pressure gauge. The catalyst may comprise aromatic hydrocarbons and ketones. The catalyst injector may additionally comprise a flow sensor. The diesel fuel refinement apparatus may additionally comprise a fuel leak sensor. The diesel fuel refinement apparatus may additionally comprise a system configured to monitor or control at least one of the following aspects of the diesel fuel refinement apparatus: (1) power applied; (2) system power, (3) fuel head optimal, (4) primary filter media optimal, (5) coalescer filter media optimal, (6) catalyst level optimal, (7) liquid (water or fuel) level in refinery enclosure, and (8) flow rate of fuel. The diesel fuel refinement apparatus may additionally comprise at least one sensor adapted to obtain data relating to the operation of the diesel fuel refinement apparatus, and a data transmitter adapted to transmit the data from the diesel fuel refinement apparatus. The data relating to the operation of the diesel fuel refinement apparatus may be selected from the group consisting of data related to (1) power applied; (2) system power, (3) fuel head optimal, (4) primary filter media optimal, (5) coalescer filter media optimal, (6) catalyst level optimal, (7) liquid (water or fuel) level in refinery enclosure, and (8) flow rate of fuel. The diesel fuel refinement apparatus may additionally comprise a source of ultrasonic energy positioned along the diesel fuel conduction system so as to reduce microbial cells in the diesel fuel.

In accordance with further aspects of the present invention, a method of refinement of diesel fuel following transport is provided comprising, at a first location, placing diesel fuel into a mobile diesel fuel refinery trailer containment tank adapted to contain and supply diesel fuel, the trailer bearing a diesel fuel refinement apparatus configured to accept diesel fuel from the containment tank. The apparatus comprises a diesel fuel conduction system, a catalyst tank containing a catalyst, and, in series, a particulate filter adapted to remove particulates from the diesel fuel flowing through the diesel fuel conduction system, a water filter adapted to remove water from diesel fuel flowing through the diesel fuel conduction system following its passage through the particulate filter, a magnetic field of sufficient strength to further refine the diesel fuel flowing through the diesel fuel conduction system following its passage through the water filter, a catalyst injector configured to inject the catalyst from the catalyst tank into the diesel fuel flowing through the diesel fuel conduction system following its passage through the magnetic field, and a dispensing conduit configured to conduct the diesel fuel from the diesel fuel refinement apparatus following injection of the catalyst. The method of refinement of diesel fuel following transport further comprises transporting the diesel fuel to a second location and refining diesel fuel through the diesel fuel refinement apparatus and dispensing the fuel to a holding tank at the second location.

In accordance with a further aspect of the present invention, a diesel fuel refinery and dispensing system is provided comprising a diesel fuel storage tank adapted to contain and supply diesel fuel, a diesel fuel refinement and dispensing apparatus configured to accept diesel fuel from the storage tank. The apparatus comprises a diesel fuel conduction system, a catalyst tank containing a catalyst, and, in series, a particulate filter adapted to remove particulates from diesel fuel flowing through the diesel fuel conduction system, a water filter adapted to remove water from diesel fuel flowing through the diesel fuel conduction system following its passage through the particulate filter, a magnetic field of sufficient strength to further refine the diesel fuel flowing through the diesel fuel conduction system following its passage through the water filter, and a catalyst injector configured to inject the catalyst from the catalyst tank into the diesel fuel flowing through the diesel fuel conduction system following its passage through the magnetic field, a dispensing conduit configured to conduct diesel fuel from the diesel fuel refinement apparatus following injection of the catalyst, a pump adapted to pump the diesel fuel through the diesel fuel refinement and dispensing apparatus, and a manually operable switch governing the pump.

The particulate filter may be of sufficient fineness to reduce microbial contamination in the diesel fuel. The particulate filter may additionally comprise a pressure gauge. The water filter may be of sufficient fineness to reduce particles of about 10 microns in the diesel fuel. The water filter may additionally comprise a pressure gauge. The catalyst may comprise aromatic hydrocarbons and ketones. The catalyst injector may additionally comprise a flow sensor. The diesel fuel refinement apparatus may additionally comprise a fuel leak sensor. The diesel fuel refinement apparatus may additionally comprise a system configured to monitor or control at least one of the following aspects of the diesel fuel refinement apparatus: (1) power applied; (2) system power, (3) fuel head optimal, (4) primary filter media optimal, (5) coalescer filter media optimal, (6) catalyst level optimal, (7) liquid (water or fuel) level in refinery enclosure, and (8) flow rate of fuel. The diesel fuel refinement apparatus may additionally comprise at least one sensor adapted to obtain data relating to the operation of the diesel fuel refinement apparatus, and a data transmitter adapted to transmit the data from the diesel fuel refinement apparatus. The data relating to the operation of the diesel fuel refinement apparatus may be selected from the group consisting of data related to (1) power applied; (2) system power, (3) fuel head optimal, (4) primary filter media optimal, (5) coalescer filter media optimal, (6) catalyst level optimal, (7) liquid (water or fuel) level in refinery enclosure, and (8) flow rate of fuel. The fuel refinery and dispensing system may additionally comprise a vehicle supportive surface configured to allow a diesel engine vehicle to be brought into the vicinity of the dispensing conduit. The dispensing conduit may be of sufficient length to supply diesel fuel from the diesel fuel refinement apparatus to the diesel engine vehicle. The diesel fuel refinement apparatus additionally comprises a source of ultrasonic energy positioned along the diesel fuel conduction system so as to reduce microbial cells in the diesel fuel.

In accordance with further aspects of the present invention, a method of dispensing refined diesel fuel to a diesel vehicle is provided comprising providing a diesel fuel storage tank adapted to contain and supply diesel fuel and a diesel fuel refinement and dispensing apparatus configured to accept diesel fuel from the storage tank. The apparatus comprises a diesel fuel conduction system, a catalyst tank containing a catalyst, and, in series, a particulate filter adapted to remove particulates from the diesel fuel flowing through the diesel fuel conduction system, a water filter adapted to remove water from diesel fuel flowing through the diesel fuel conduction system following its passage through the particulate filter, a magnetic field of sufficient strength to further refine the diesel fuel flowing through the diesel fuel conduction system following its passage through the water filter, a catalyst injector configured to inject the catalyst from the catalyst tank into the diesel fuel flowing through the diesel fuel conduction system following its passage through the magnetic field, a dispensing conduit configured to conduct the diesel fuel from the diesel fuel refinement apparatus following injection of the catalyst, a pump adapted to pump the diesel fuel through the diesel fuel refinement and dispensing apparatus, a manually operable switch governing the pump, and a vehicle supportive surface configured to allow a diesel engine vehicle to be brought into the vicinity of the dispensing conduit. The dispensing conduit is of sufficient length to supply diesel fuel from the diesel fuel refinement apparatus to the diesel engine vehicle. The method of dispensing refined diesel fuel to a diesel vehicle further comprises monitoring the flow of the diesel fuel through the diesel fuel refinement apparatus to the diesel engine vehicle.

In accordance with a further aspect of the present invention, a diesel fuel composition is provided produced by the process of the following steps in series performed upon a diesel fuel containing particulates and water: removing particulates from the diesel fuel, removing water from the diesel fuel, subjecting the diesel fuel to a magnetic field of sufficient strength to further refine the diesel fuel following the removal of particulates and water, and admixing a catalyst into the diesel fuel following its refinement by the magnetic field.

The particulate content of the diesel fuel composition produced by the process may be below about 2 microns. The water content of the diesel fuel composition produced by the process may be below about 10 PPM. The microbial content of the diesel fuel composition produced by the process may be below about 1 LFV/mL. The cetane value of the diesel fuel composition produced by the process may be in the range of 45-52. The lubricity value of the diesel fuel composition produced by the process is about 2.65 CST or better. The catalyst may comprise aromatic hydrocarbons and ketones and may be present in a ratio of 1/500 or at least 1/1000.

In accordance with further aspects of the present invention, a diesel fuel composition is provided comprising a diesel fuel hydrocarbon having the following characteristics to be selected independently to characterize the inventive composition in one or more combinations: a particulate content below about 2 microns, a cetane value in the range of 45-52, a lubricity value of 2.65 CST or better, a microbial content value of about 1 CFL/mL, a catalyst comprising aromatic hydrocarbons and ketones and present in a ratio of about 1/500 or at least 1/1000.

The particulate content of the diesel fuel composition may be below about 2 microns. The water content of the diesel fuel composition may be below about 10 PPM. The microbial content of the diesel fuel composition may be below about 1 CFL/mL. The cetane value of the diesel fuel composition may be in the range of 45-52.

DESCRIPTION OF THE FIGURES

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
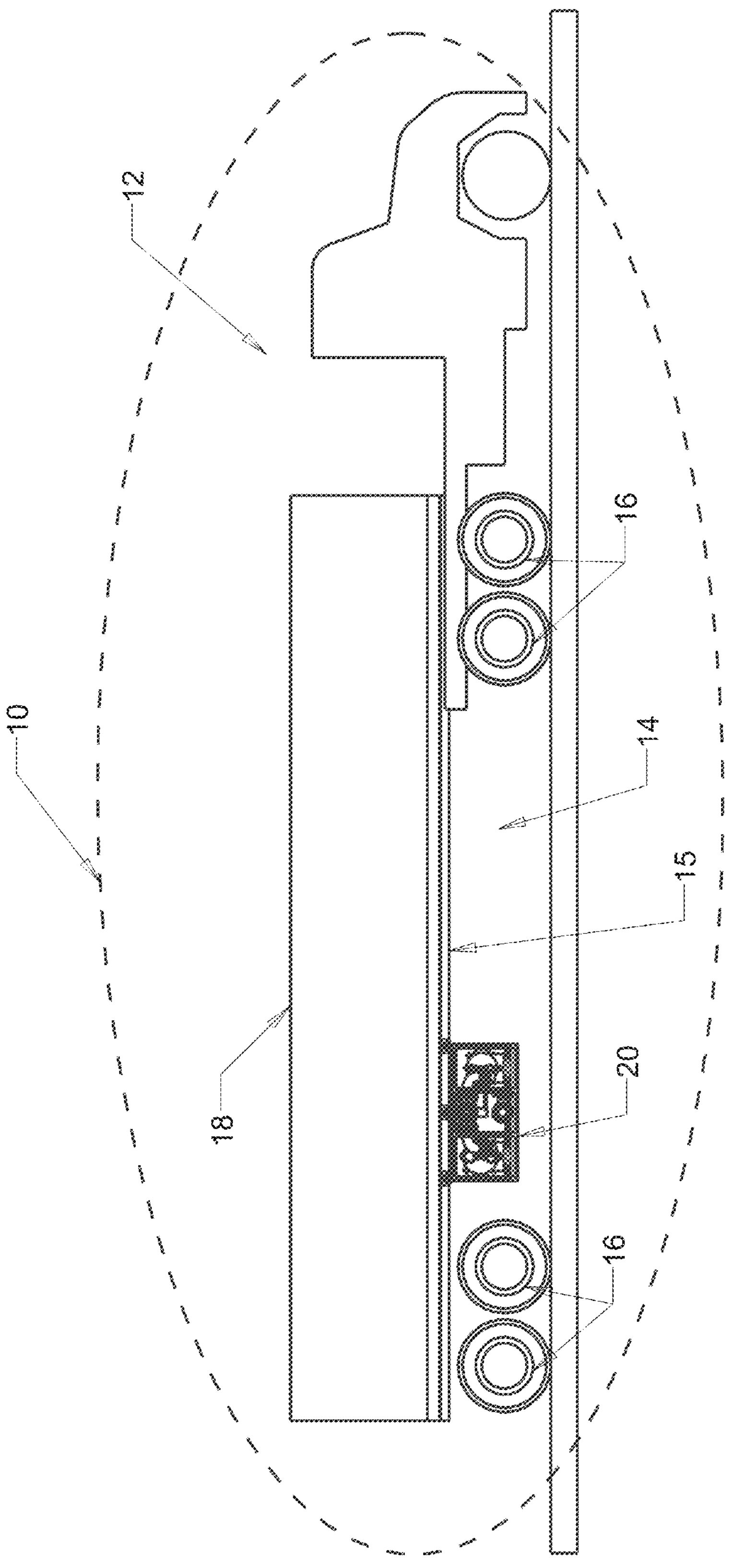
FIG. 1 is a side view of a mobile diesel fuel refinery system according to aspects of the present invention.

Referring now to FIG. 1, a mobile diesel fuel refinery system is disclosed. The mobile diesel fuel refinery system 10 includes a vehicle 12, typically a large commercial transport truck, with a trailer 14. The trailer 14 features an underside 15 and wheels 16. A containment tank 18 is mounted on the trailer 14 and adapted to contain and supply diesel fuel. A diesel fuel refinement apparatus 20 is mounted on the underside 15 of the trailer 14. The diesel fuel refinement apparatus 20 is configured to accept diesel fuel from the containment tank 18.

Figure 2:
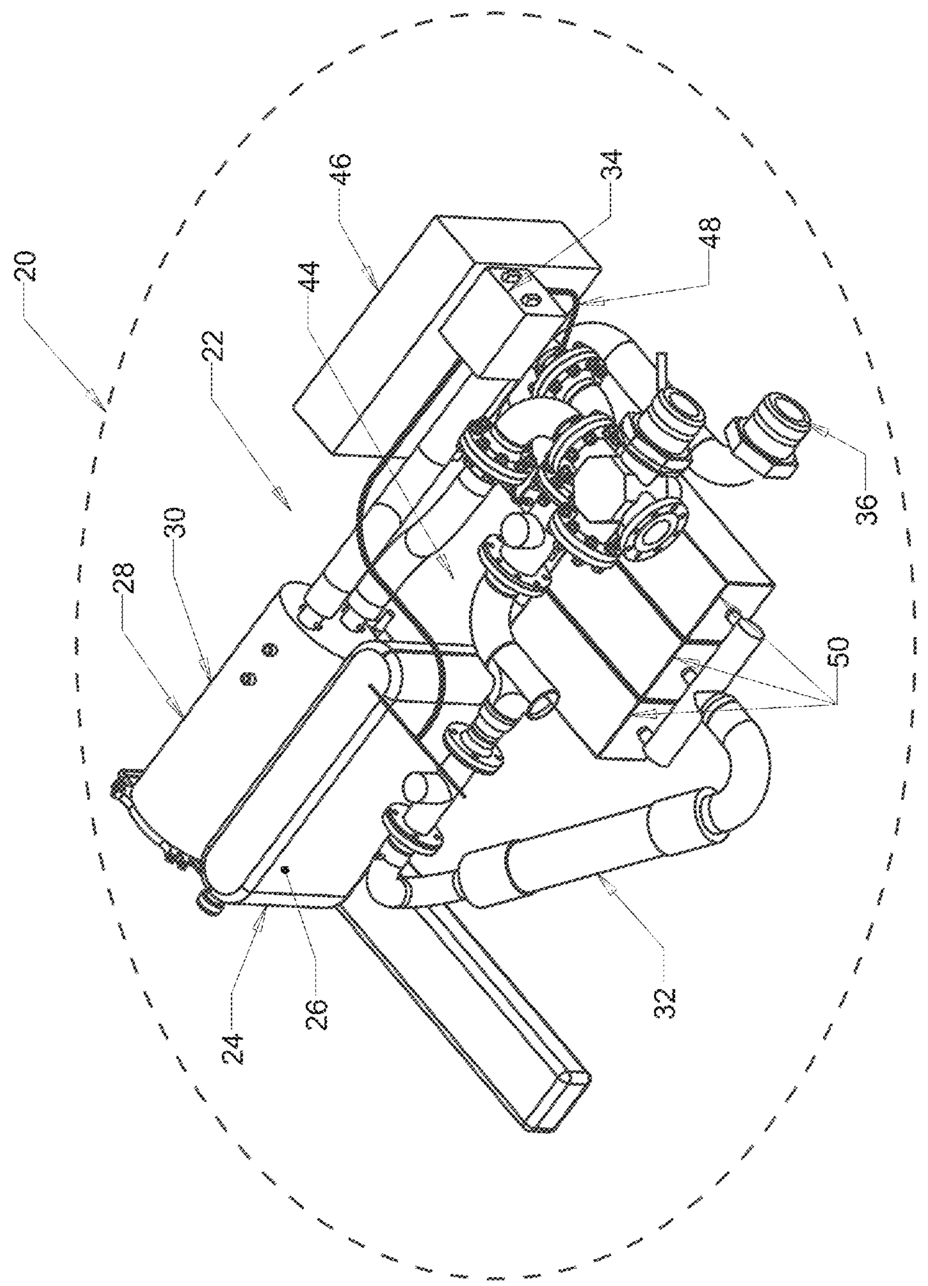
FIG. 2 is a cross-sectional view of a diesel fuel refinement apparatus according to aspects of the present invention.

Referring now to FIG. 2, the diesel fuel refinement apparatus 20 comprises a diesel fuel conduction system 22 and a catalyst tank 24 containing a catalyst 26. As shown in FIG. 2 and further displayed in the flowchart of FIG. 3, the diesel fuel refinement apparatus further comprises, in series, a particulate filter 28 adapted to remove particulates from diesel fuel flowing through the diesel fuel conduction system 22, a water filter 30 adapted to remove water from diesel fuel flowing through the diesel fuel conduction system 22 following its passage through the particulate filter 28, a magnetic field 32 of sufficient strength to further refine the diesel fuel flowing through the diesel fuel conduction system 22 following its passage through the water filter 30, a catalyst injector 34 configured to inject the catalyst 26 from the catalyst tank 24 into the diesel fuel flowing through the diesel fuel conduction system 22 following its passage through the magnetic field 32, and a dispensing conduit 36 configured to conduct the diesel fuel from the diesel fuel refinement apparatus 20 following injection of the catalyst 26.

Figure 6:
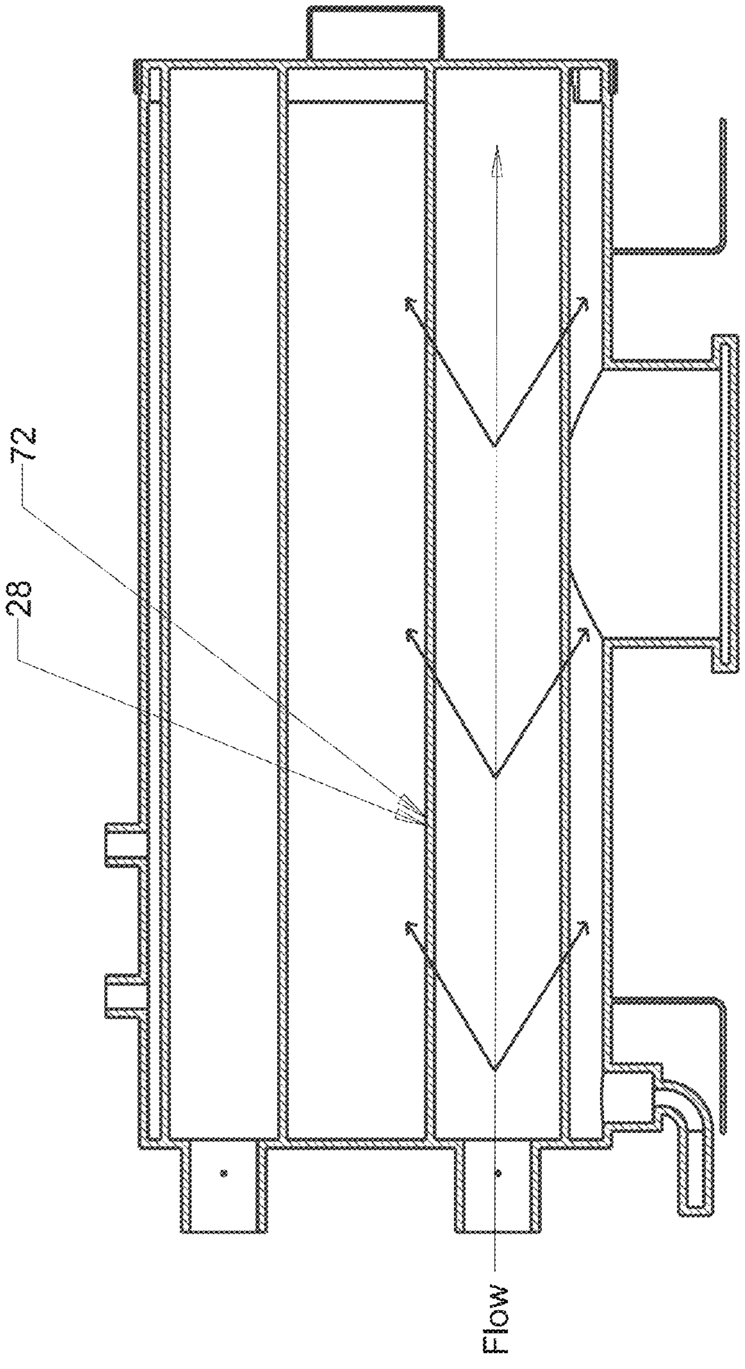
FIG. 6 is a perspective view of a particulate filter of a diesel fuel refinement apparatus according to aspects of the present invention.

Referring now to FIG. 6, the particulate filter 28 of the preferred embodiment is shown. The particulate filter 28 of FIG. 6 is of sufficient fineness to reduce microbial contamination in the diesel fuel. Additionally, the particulate filter 28 comprises a pressure gauge 38, as shown in the preferred embodiment of FIG. 4.

Figure 9:
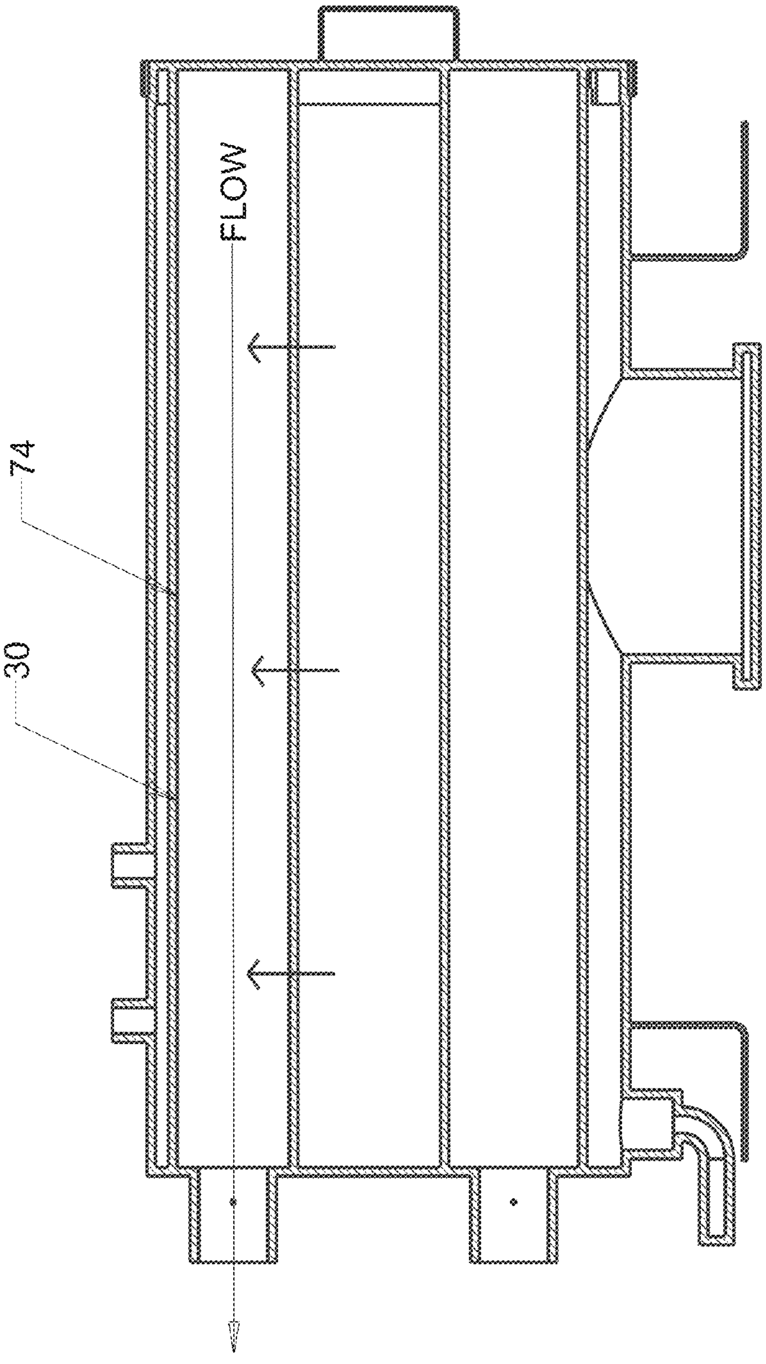
FIG. 9 is a cross-sectional view of a water filter of the diesel fuel refinement apparatus according to aspects of the present invention.

Referring now to FIG. 9, the water filter 30 of the preferred embodiment is shown as a water coalescer. The water filter 30 is of sufficient fineness to reduce particles of about 10 microns in the diesel fuel. Referring again to FIG. 4, the water filter 30 of the preferred embodiment additionally comprises a water pressure gauge 40.

Figure 8:
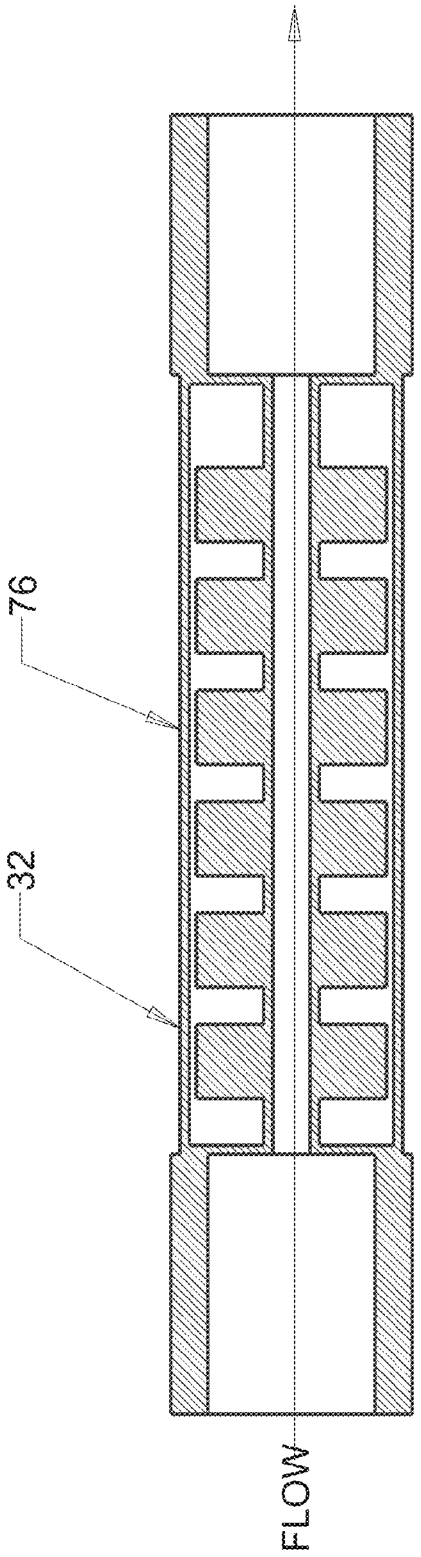
FIG. 8 is a perspective view of a magnetic field source and structure of a diesel fuel refinement apparatus according to aspects of the present invention.

The catalyst of the preferred embodiment comprises aromatic hydrocarbons and ketones. The magnetic field 32 mechanically cracks the diesel fuel chains, thereby creating more surface area for bonding of the diesel fuel with the catalyst 26. Referring now to FIG. 8, a structure supplying a magnetic field 32 of a preferred embodiment of the present invention is shown. The catalyst injector 34 injects the catalyst 26 into the diesel fuel immediately after the fuel passes through the magnetic field 32. Immediate catalyst injection allows the catalyst 26 to quickly bond to the increased surface area of the diesel molecules before the effect of the mechanical cracking dissipates as the diesel molecules gradually rejoin each other. In the preferred embodiment of the present invention, the catalyst 26 is injected within three seconds of the fuel passing through the magnetic field 32. Also, in the preferred embodiment, the catalyst injector 34 is located no more than 12 inches from the magnetic field 32 such that catalyst 26 is injected immediately after the fuel is subjected to the magnetic field 32.

Figure 5:
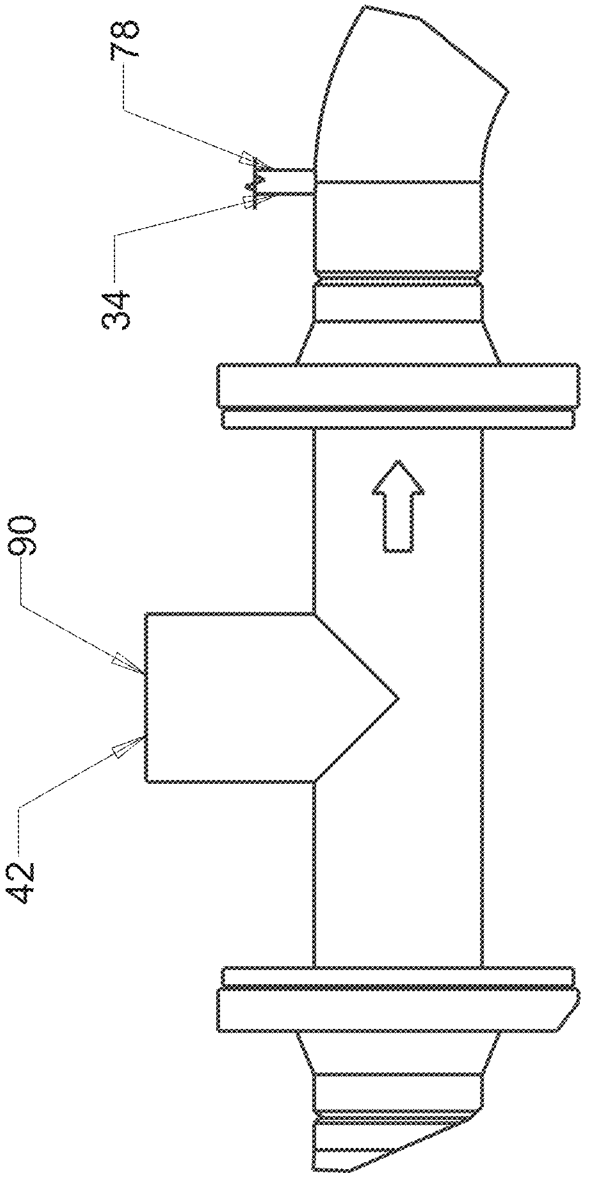
FIG. 5 is a side view of a flow sensor of the diesel fuel refinement apparatus according to aspects of the present invention.

Referring now to FIG. 5, the catalyst injector 34 of the preferred embodiment comprises a flow sensor 42. As shown in FIG. 2, the diesel fuel refinement apparatus 20 of the preferred embodiment additionally comprises a fuel leak sensor 44

The diesel fuel refinement apparatus 20 of the preferred embodiment additionally comprises a system 46 configured to monitor or control one or more of the following aspects of the diesel fuel refinement apparatus: power applied, system power, fuel head optimal, primary filter media optimal, coalescer filter media optimal, catalyst level optimal, liquid (water or fuel) level in refinery enclosure, and flow rate of fuel.

The diesel fuel refinement apparatus 20 of the preferred embodiment additionally comprises one or more sensors adapted to obtain data relating to the operation of the diesel fuel refinement apparatus 20. As shown in FIG. 2, a data transmitter 48 adapted to transmit the data from the diesel fuel refinement apparatus 20. The data relating to the operation of the diesel fuel refinement apparatus 20 may relate to power applied, system power, fuel head optimal, primary filter media optimal, coalescer filter media optimal, catalyst level optimal, liquid (water or fuel) level in refinery enclosure, or flow rate of fuel.

Figure 7:
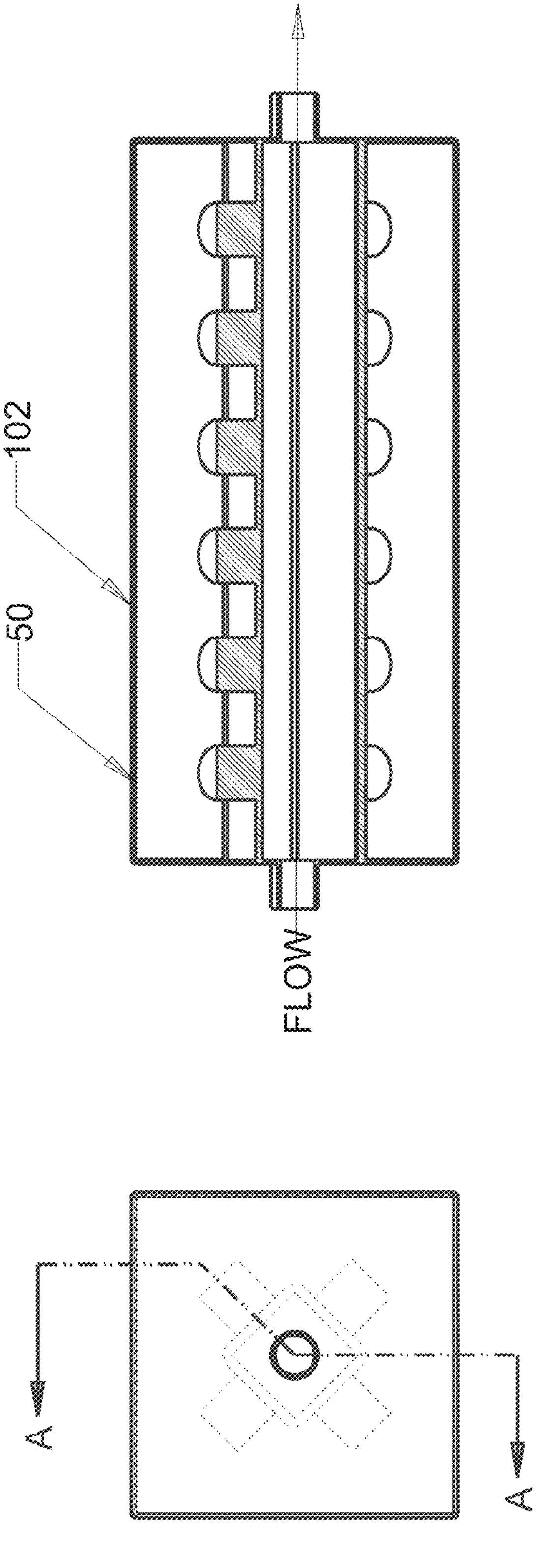
FIG. 7 is a perspective view of an ultrasonic energy source of a diesel fuel refinement apparatus according to aspects of the present invention.

Referring now to FIG. 7, the diesel fuel refinement apparatus 20 of the preferred embodiment may additionally comprises a source of ultrasonic energy 50 positioned along the diesel fuel conduction system 22 so as to reduce microbial cells in the diesel fuel. Additionally, the source of ultrasonic energy 50 may be used as an additional means of cracking the diesel fuel molecules. As with the magnetic field 32 discussed above, the catalyst 26 may be injected immediately after fuel has been cracked by the source of ultrasonic energy 50 to accelerate bonding of the catalyst 26 with the fuel.

Figure 3:
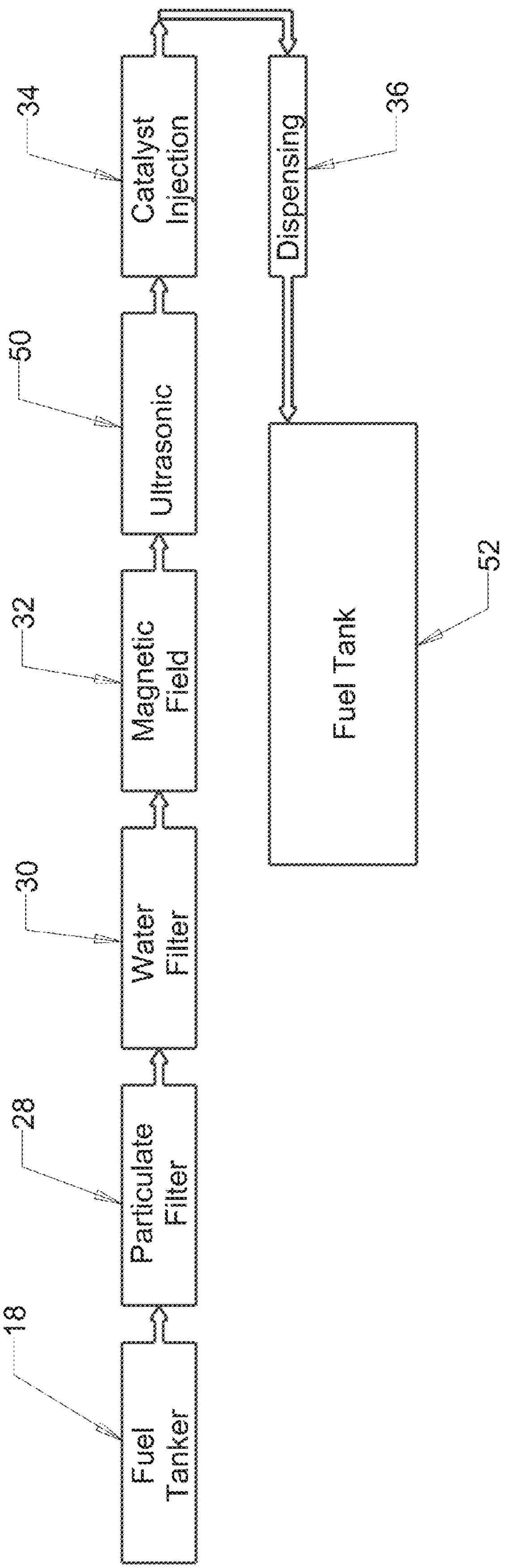
FIG. 3 is a schematic view of a mobile diesel fuel refinery system according to aspects of the present invention.

The operation of the mobile diesel fuel refinery system 10 involves refinement of diesel fuel following transport. In a preferred embodiment of the present invention, at a first location, diesel fuel is placed into a mobile diesel fuel refinery trailer containment tank 18 adapted to contain and supply diesel fuel. The trailer 14 bears a diesel fuel refinement apparatus 20 and is configured to accept diesel fuel from the containment tank 18. Following transport, the diesel fuel is conducted through the diesel fuel conduction system 22, as described above. As shown in FIG. 3, the diesel fuel is conducted through a particulate filter 28 adapted to remove particulates, a water filter 30 adapted to remove water after the fuel passes through the particulate filter 28, a magnetic field 32 of sufficient strength to further refine the diesel fuel following its passage through the water filter 30, a catalyst injector 34 configured to inject the catalyst 26 from the catalyst tank 24 into the diesel fuel following its passage through the magnetic field 32, and a dispensing conduit 36 to finally dispense the fuel from the diesel fuel refinement apparatus 20 after injection of the catalyst 26. The method of refinement of diesel fuel following transport of the preferred embodiment of the present invention further comprises transporting the diesel fuel to a second location and refining diesel fuel through the diesel fuel refinement apparatus 20 and dispensing the fuel to a holding tank 52 at the second location. The second location may be a vehicle fueling station such as a consumer gas station or a central storage or fueling station for a vehicle fleet.

Figure 10:
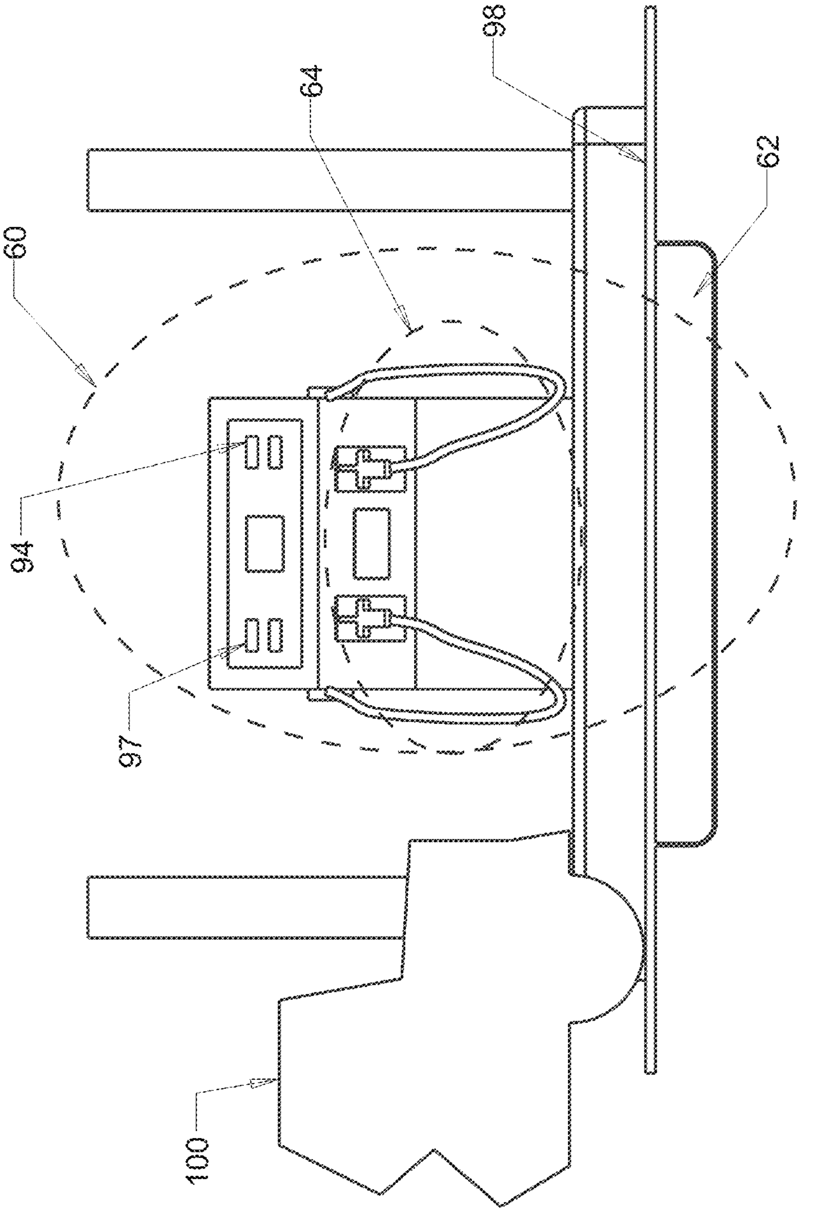
FIG. 10 is a perspective view of a diesel fuel refinery and dispensing system according to aspects of the present invention.
Figure 11:
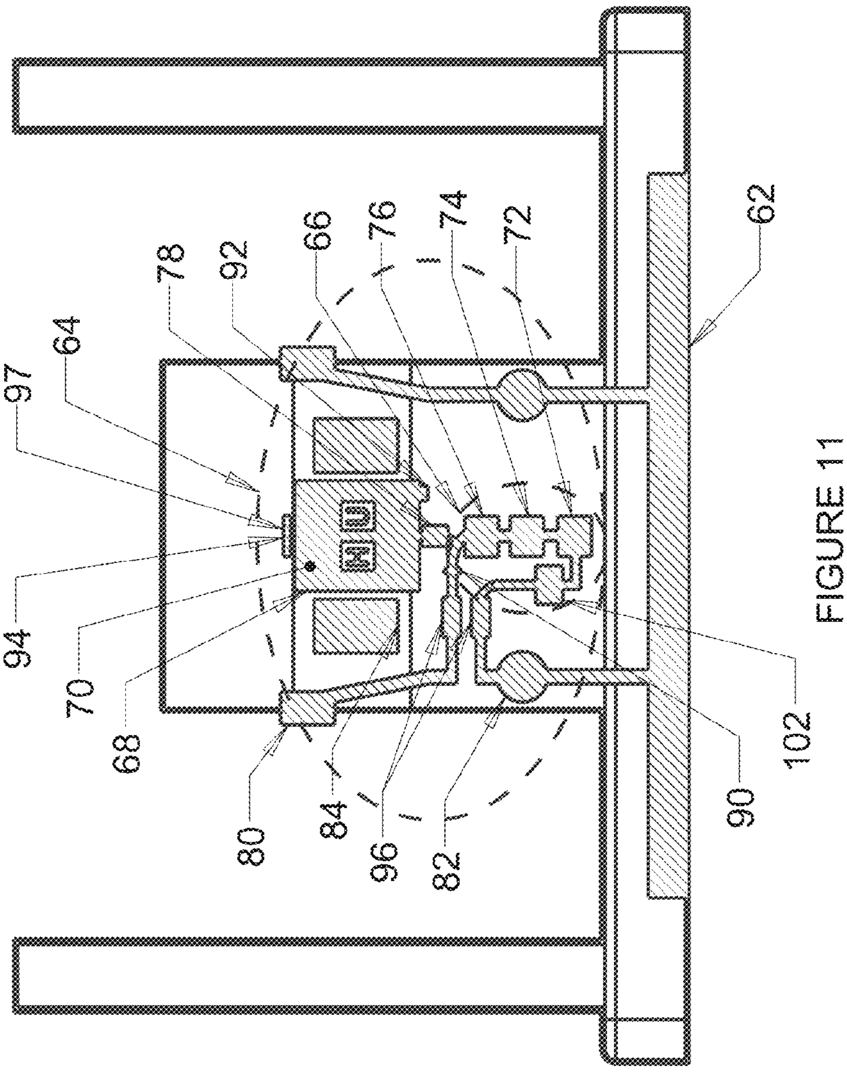
FIG. 11 is cross-sectional view of the diesel fuel refinery and dispensing system according to aspects of the present invention.

Reference is now made to FIGS. 10-13, which show aspects of a diesel fuel refinery and dispensing system 60 of the present invention. A diesel fuel storage tank 62 is adapted to contain and supply diesel fuel. As shown in FIGS. 10 and 11, a diesel fuel refinement and dispensing apparatus 64 is configured to accept diesel fuel from the storage tank 62. The apparatus 64 comprises a diesel fuel conduction system 66, a catalyst tank 68 containing a catalyst 70, and, in series, a particulate filter 72 adapted to remove particulates, a water filter 74 adapted to remove water after the fuel passes through the particulate filter 72, a magnetic field 76 of sufficient strength to further refine the diesel fuel following its passage through the water filter 74, and a catalyst injector 78 configured to inject the catalyst 70 from the catalyst tank 68 into the diesel fuel flowing through the diesel fuel conduction system 66 following its passage through the magnetic field 76, and a dispensing conduit 80 configured to conduct diesel fuel from the diesel fuel refinement apparatus 64 following injection of the catalyst 70. The apparatus 64 further comprises a pump 82 adapted to pump the diesel fuel through the diesel fuel refinement and dispensing apparatus 64 and a manually operable switch 84 governing the pump 82.

Figure 4:
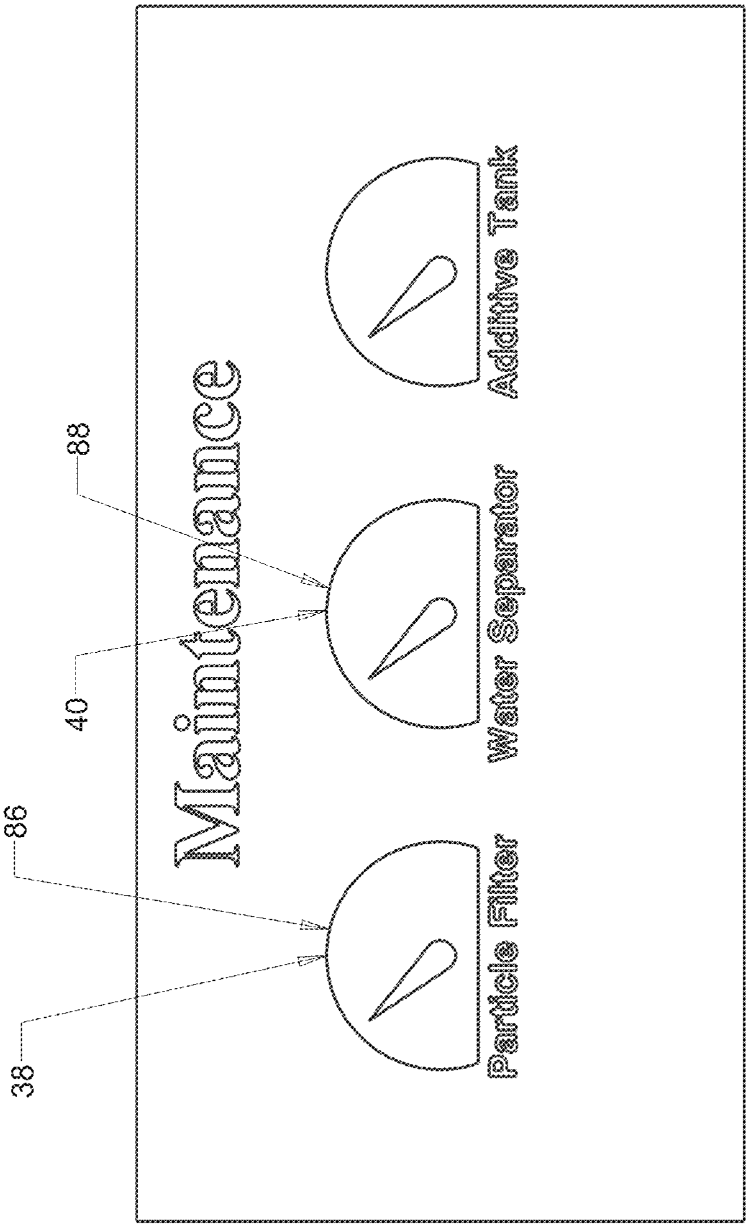
FIG. 4 is a top view of operations panel gauges of a mobile diesel fuel refinery system according to aspects of the present invention.

As with the mobile diesel fuel refinery system disclosed above, the particulate filter 72 of the diesel fuel refinery and dispensing system 60 of the preferred embodiment of the present invention is of sufficient fineness to reduce microbial contamination in the diesel fuel. Referring again to FIG. 6, the particulate filter 72 of a preferred embodiment of the present invention is shown. The particulate filter 72 additionally comprises a pressure gauge 86, as shown in FIG. 4. The water filter 74 of the preferred embodiment is a water coalescer and is of sufficient fineness to reduce particles of about 10 microns in the diesel fuel. The water filter 74 of the preferred embodiment additionally comprises a pressure gauge 88, as shown in FIG. 4.

The catalyst 70 of the preferred embodiment of the present invention comprises aromatic hydrocarbons and ketones. The magnetic field 76 mechanically cracks the diesel fuel chains, thereby creating more surface area for bonding of the diesel fuel with the catalyst 70. Referring again to FIG. 8, a magnetic field 76 of a preferred embodiment of the present invention is shown. The catalyst injector 78 injects the catalyst 70 into the diesel fuel immediately after the fuel passes through the magnetic field 76. Immediate catalyst injection allows the catalyst 70 to quickly bond to the increased surface area of the diesel molecules before the effect of the mechanical cracking dissipates as the diesel molecules gradually rejoin each other. In the preferred embodiment of the present invention, the catalyst 70 is injected within three seconds of the fuel passing through the magnetic field 76. Also, in the preferred embodiment, the catalyst injector 78 is located no more than 12 inches from the magnetic field 76 such that catalyst 70 is injected immediately after the fuel is subjected to the magnetic field 76. The catalyst injector 78 of the preferred embodiment additionally comprises a flow sensor 90, as shown in FIG. 5. The diesel fuel refinement and dispensing apparatus 64 additionally comprises a fuel leak sensor 92, as shown in FIG. 11.

The diesel fuel refinement and dispensing apparatus 64 of the preferred embodiment additionally comprises a system 94 configured to monitor or control at least one of the following aspects of the diesel fuel refinement apparatus: power applied, system power, fuel head optimal, primary filter media optimal, coalescer filter media optimal, catalyst level optimal, liquid (water or fuel) level in refinery enclosure, and flow rate of fuel. The diesel fuel refinement and dispensing apparatus 64 of the preferred embodiment additionally comprises at least one sensor 96 adapted to obtain data relating to the operation of the diesel fuel refinement and dispensing apparatus 64, and a data transmitter 97 adapted to transmit the data from the diesel fuel refinement apparatus 64. The data relating to the operation of the diesel fuel refinement and dispensing apparatus 64 of the preferred embodiment is selected from the group consisting of data related to power applied, system power, fuel head optimal, primary filter media optimal, coalescer filter media optimal, catalyst level optimal, liquid (water or fuel) level in refinery enclosure, and flow rate of fuel.

The fuel refinery and dispensing system 60 of the preferred embodiment additionally comprises a vehicle supportive surface 98 configured to allow a diesel engine vehicle 100 to be brought into the vicinity of the dispensing conduit 80, as shown in FIG. 10. The dispensing conduit 80 is of sufficient length to supply diesel fuel from the diesel fuel refinement and dispensing apparatus 64 to the diesel engine vehicle 100.

In a further embodiment of the present invention, the diesel fuel refinement and dispensing apparatus 64 additionally comprises a source of ultrasonic energy 102 positioned along the diesel fuel conduction system 66 so as to reduce microbial cells in the diesel fuel, as shown FIG. 7.

Figure 12:
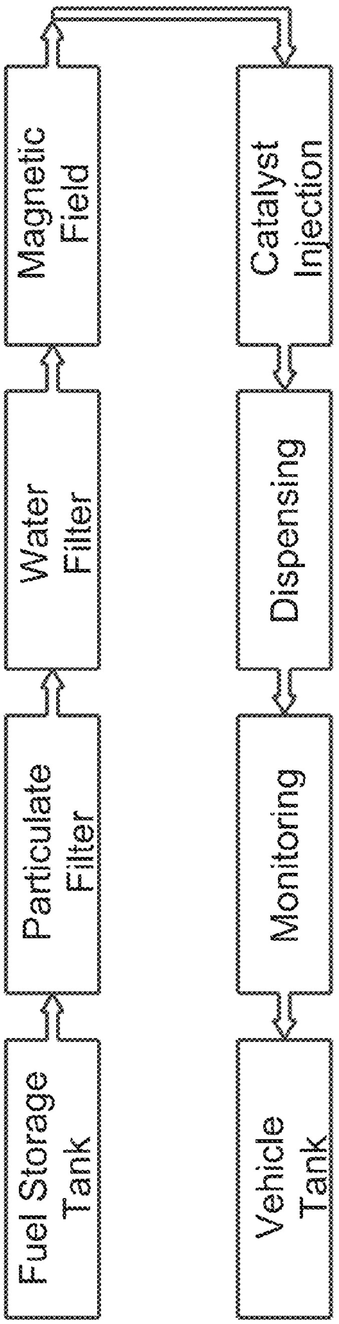
FIG. 12 is a schematic view of a diesel fuel refinery and dispensing system according to aspects of the present invention.

As shown in FIG. 12, the method of refinement and dispensing of diesel fuel of the preferred embodiment of the present invention comprises the process similar to the process detailed in FIG. 3. The method of dispensing refined diesel fuel to a diesel vehicle further comprises monitoring the flow of the diesel fuel through the diesel fuel refinement and dispensing apparatus 64 to the diesel engine vehicle 100.

Figure 13:
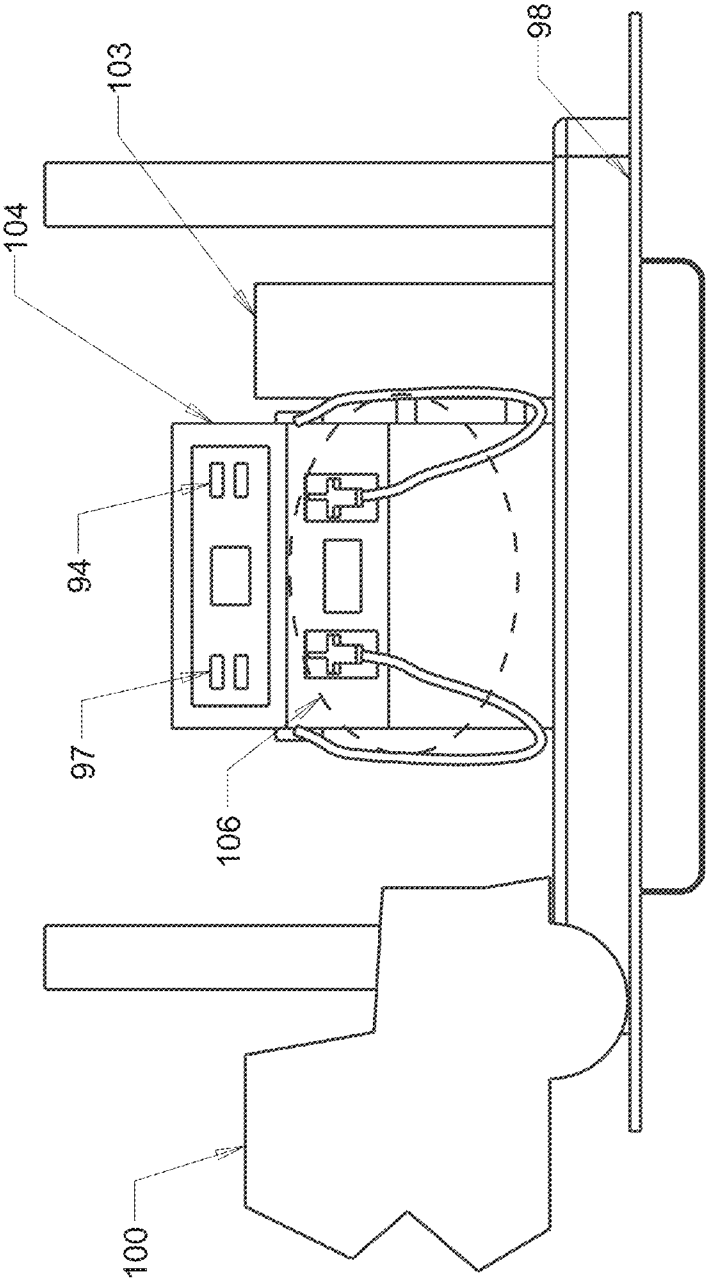
FIG. 13 is a perspective view of a diesel fuel refinery and dispensing system according to further aspects of the present invention.

The fuel refinery and dispensing system 60 of the preferred embodiment of the present invention shown in FIGS. 10 and 11 includes a catalyst tank 68 incorporated into the structure of the diesel fuel refinement and dispensing apparatus 64. Referring now to FIG. 13, the diesel fuel refinery and dispensing system of an alternative embodiment features a catalyst tank 103 disposed adjacent to, but outside of, a structure 104 enclosing a diesel fuel refinement and dispensing apparatus 106.

The preferred embodiment of the present invention details a diesel fuel, but other types of vehicle fuel are contemplated by the structures, systems, and methods of the present disclosure. Such other fuels that can be transported, refined, and dispensed according to aspects of the present invention include gasoline, biodiesel, ethanol, kerosene, natural gas, and propane.

The diesel fuel composition of the preferred embodiment of the present invention is produced by the process of the steps in series performed upon a diesel fuel containing particulates and water as shown in FIGS. 3 and 12. The steps include removing particulates from the diesel fuel, removing water from the diesel fuel, subjecting the diesel fuel to a magnetic field of sufficient strength to further refine the diesel fuel following the removal of particulates and water, and admixing a catalyst into the diesel fuel following its refinement by the magnetic field.

The particulate content of the diesel fuel composition produced by the process may be below about 2 microns. The water content of the diesel fuel composition produced by the process may be below about 10 PPM. The microbial content of the diesel fuel composition produced by the process may be below about 1 LFV/mL. The cetane value of the diesel fuel composition produced by the process may be in the range of 45-52. The lubricity value of the diesel fuel composition produced by the process is about 2.65 CST or better. The catalyst of an embodiment comprises aromatic hydrocarbons and ketones and is present in a ratio of 1/500 or at least 1/1000.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mobile diesel fuel refinery system, said system comprising:

a. a trailer having an underside and comprising wheels;

b. a containment tank mounted on said trailer and adapted to contain and supply diesel fuel;

c. a diesel fuel refinement apparatus mounted on said underside of said trailer and configured to accept diesel fuel from said containment tank, said apparatus comprising a diesel fuel conduction system, a catalyst tank containing a catalyst, and, in series:

i. a particulate filter adapted to remove particulates from diesel fuel flowing through said diesel fuel conduction system;

ii. a water filter adapted to remove water from diesel fuel flowing through said diesel fuel conduction system following its passage through said particulate filter;

iii. a magnetic field of sufficient strength to further refine said diesel fuel flowing through said diesel fuel conduction system following its passage through said water filter;

iv. a catalyst injector configured to inject said catalyst from said catalyst tank into said diesel fuel flowing through said diesel fuel conduction system following its passage through said magnetic field; and v. a dispensing conduit configured to conduct said diesel fuel from said diesel fuel refinement apparatus following injection of said catalyst.

2. A mobile diesel fuel refinery system according to claim 1 wherein said particulate filter is of sufficient fineness to reduce microbial contamination in said diesel fuel.

3. A mobile diesel fuel refinery system according to claim 1 wherein said particulate filter additionally comprises a pressure gauge.

4. A mobile diesel fuel refinery system according to claim 1 wherein said water filter is of sufficient fineness to reduce particles of about 10 microns in said diesel fuel.

5. A mobile diesel fuel refinery system according to claim 1 wherein said water filter additionally comprises a pressure gauge.

6. A mobile diesel fuel refinery system according to claim 1 wherein said catalyst comprises aromatic hydrocarbons and ketones.

7. A mobile diesel fuel refinery system according to claim 1 wherein said catalyst injector additionally comprises a flow sensor.

8. A mobile diesel fuel refinery system according to claim 1 wherein said diesel fuel refinement apparatus additionally comprises a fuel leak sensor.

9. A mobile diesel fuel refinery system according to claim 1 wherein said diesel fuel refinement apparatus additionally comprises a system configured to monitor or control at least one of the following aspects of the diesel fuel refinement apparatus: (1) power applied; (2) system power, (3) fuel head optimal, (4) primary filter media optimal, (5) coalescer filter media optimal, (6) catalyst level optimal, (7) liquid (water or fuel) level in refinery enclosure, and (8) flow rate of fuel.

10. A mobile diesel fuel refinery system according to claim 1 wherein said diesel fuel refinement apparatus additionally comprises at least one sensor adapted to obtain data relating to the operation of said diesel fuel refinement apparatus, and a data transmitter adapted to transmit said data from said diesel fuel refinement apparatus.

11. A mobile diesel fuel refinery system according to claim 10 wherein said data relating to the operation of said diesel fuel refinement apparatus is selected from the group consisting of data related to (1) power applied; (2) system power, (3) fuel head optimal, (4) primary filter media optimal, (5) coalescer filter media optimal, (6) catalyst level optimal, (7) liquid (water or fuel) level in refinery enclosure, and (8) flow rate of fuel.

12. A mobile diesel fuel refinery system according to claim 1 wherein said diesel fuel refinement apparatus additionally comprises a source of ultrasonic energy positioned along said diesel fuel conduction system so as to reduce microbial cells in said diesel fuel.

* * * * *